T. E. FALSEY.
COW STANCHION.
APPLICATION FILED MAR. 30, 1916.

1,201,451.

Patented Oct. 17, 1916.
2 SHEETS—SHEET 1.

Witnesses
Fenton S. Belt
J. W. Sherwood

Inventor
Thomas E. Falsey
By Franklin W. Hough
Attorney

T. E. FALSEY.
COW STANCHION.
APPLICATION FILED MAR. 30, 1916.

1,201,451.

Patented Oct. 17, 1916.
2 SHEETS—SHEET 2.

Witnesses
Fenton S. Belt
J. W. Sherwood

Inventor
Thomas E. Falsey
By Franklin H. Hough
Attorney

UNITED STATES PATENT OFFICE.

THOMAS E. FALSEY, OF WAVERLY, NEW YORK.

COW-STANCHION.

1,201,451.  Specification of Letters Patent.  Patented Oct. 17, 1916.

Application filed March 30, 1916. Serial No. 87,820.

*To all whom it may concern:*

Be it known that I, THOMAS E. FALSEY, a citizen of the United States, residing at Waverly, in the county of Tioga and State of New York, have invented certain new and useful Improvements in Cow-Stanchions; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in cattle stanchions and it has for its object to provide a cattle stanchion which will automatically lock cattle in their respective stalls, said stalls and stanchions being arranged in rows and are adapted to be unlocked simultaneously by a single crank handle.

A further object of the invention is to provide a stanchion which will be cheap to manufacture, easy to install and sanitary in its arrangement.

The invention comprises various other details of construction, combinations and arrangements of parts which will be hereinafter fully described, shown in the accompanying drawings and then specifically defined in the appended claims.

Figure 1:
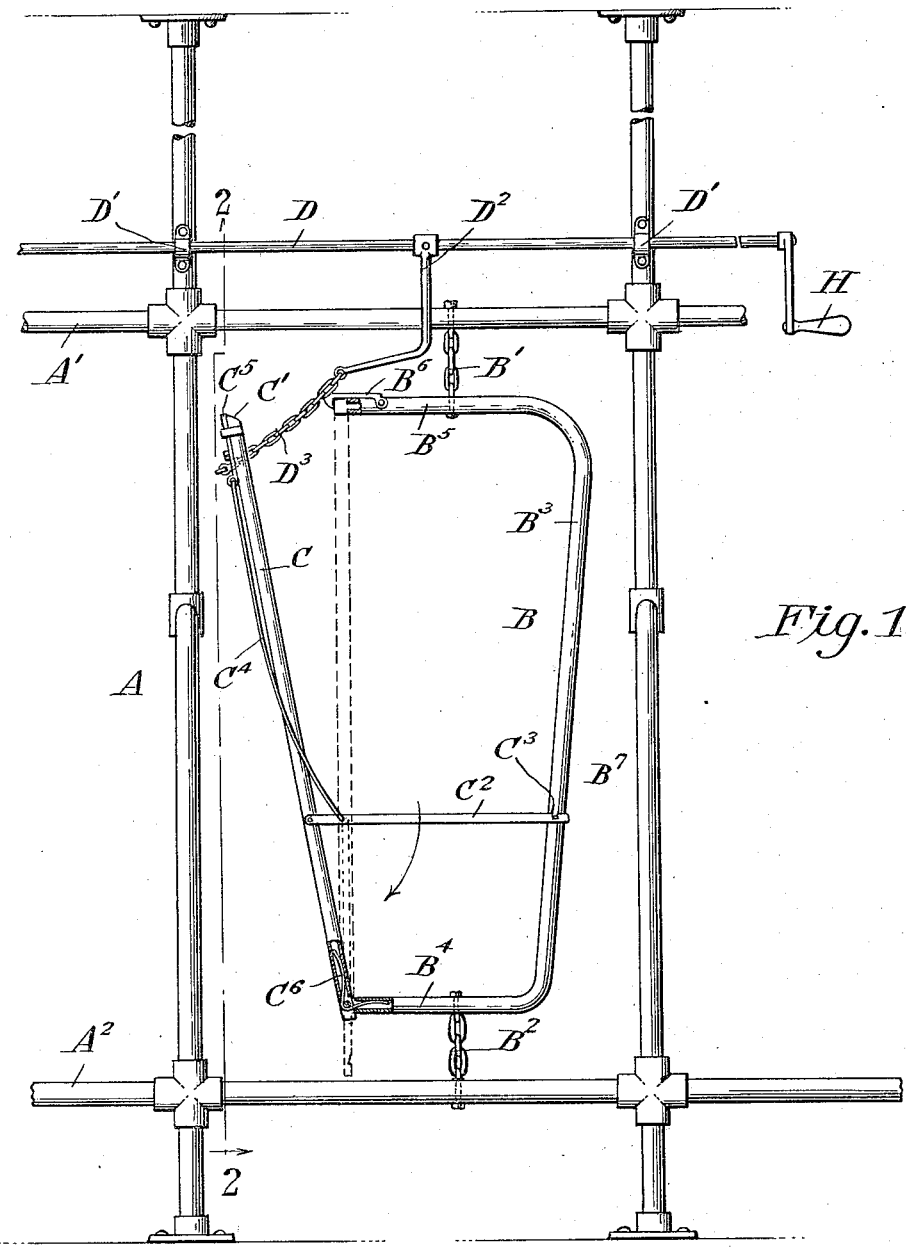
Figure 2:
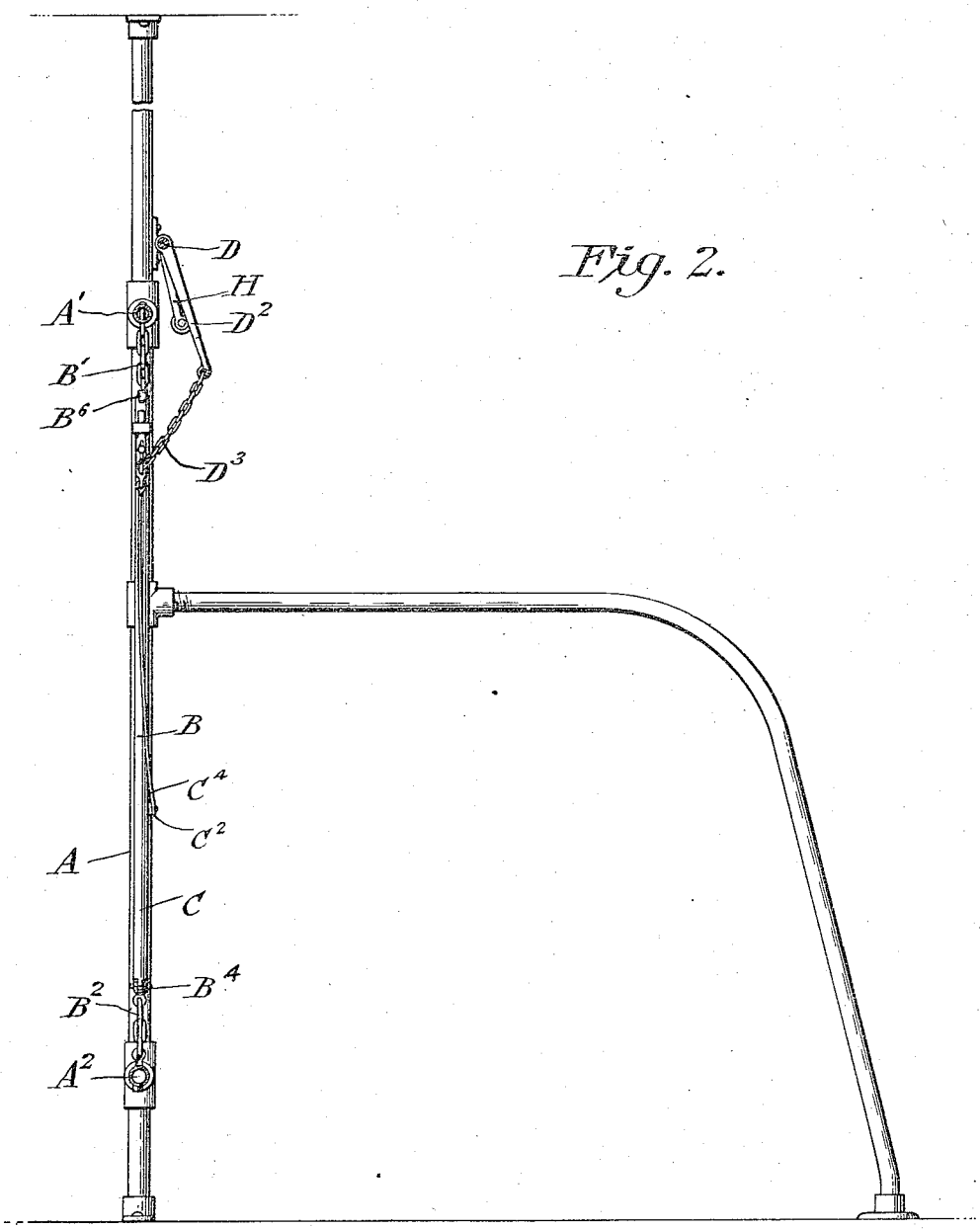

My invention is illustrated in the accompanying drawings, in which:

Figure 1 is a front elevation of a cow stanchion constructed in accordance with my invention, and Fig. 2 is a vertical section taken on line 2—2 of Fig. 1.

Reference now being had to the details of the drawings by letter, A designates a suitable open framework located between the floor and ceiling of a cattle shed or barn and comprises an upper bar $A^1$ and a lower bar or rail $A^2$. A yoke B is suspended and held between the bars $A^1$ and $A^2$ by chains $B^1$ and $B^2$, as shown. The yoke comprises a member $B^3$ which has its upper end bent to form an arm $B^5$ and its lower end bent to form an arm $B^4$. A locking bar C has its lower end pivotally connected to the outer end of the arm $B^4$ and its upper end is provided with a beveled portion $C^1$ which is adapted to pass under and be held by a latch $B^6$ secured to the arm $B^5$. A tripping bar $C^2$ is pivotally mounted near the lower end of the bar C and is provided with a square-faced notch $C^3$ which engages a pin $B^7$ on the bar $B^3$ and serves to hold the bar C in unlocked or open position for the reception of the head and neck of a cow.

A rock shaft D is mounted in suitable bearing clips $D^1$ on the framework and has a plurality of crank arms $D^2$ (only one being shown) secured thereto. Said arm $D^2$ is connected by a chain $D^3$ to the unlocking bolt $C^5$, slidably mounted on the upper end of the bar C. A bent rod $C^4$ connects the bolt $C^5$ with the tripping bar $C^2$ and a spring $C^6$ is provided for the purpose of moving the bar C carrying the bolt $C^5$ to locking engagement with the latch $B^6$.

In operation, the stanchions being open as shown by full lines in Fig. 1, the cattle are permitted to enter the aisles of stalls. Each animal will select a stall and insert its head through a stanchion in search of hay or other food which is usually placed within easy reach and in so doing its throat portion will contact and release the tripping bar $C^2$ and permit the spring $C^6$ to automatically lock the cow securely in the yoke. In order to release the cattle, it is only necessary to raise the handle H which will cause the arm $D^2$ to pull the chain $D^3$ which, being attached to the bolt $C^5$, will cause the bolt to raise the latch $B^6$ and the operator, by pushing the rock shaft D from one end or pulling it at the other longitudinally in its bearings, will open the locking bar to the position shown in full lines where it will be held by the notch $C^3$ in the tripping bar $C^2$, engaging the pin $B^7$ and the stanchion is left in position to automatically lock the cattle when they enter again.

What I claim to be new is:—

1. A stanchion comprising a frame, a yoke connected thereto, a catch carried by the yoke, a spring-actuated locking bar pivoted to the yoke and adapted to be engaged by the catch, a pin carried by the yoke, a tripping bar pivoted to the locking bar and having a notch engageable with the pin to hold the locking bar in an open position with relation to the yoke, a bolt slidably mounted upon the locking bar and operatively connected with the tripping bar, and a shaft turnably mounted on the frame and operatively connected with the bolt.

2. A stanchion comprising a frame, a yoke connected thereto, a locking bar pivotally connected with the yoke, a slidable bolt for releasing the locking bar from closed position with relation to the yoke, a tripping bar pivoted on the locking bar and adapted to hold the locking bar in an open position with relation to the yoke, and a shaft turnably and slidably mounted on the frame and operatively connected with the releasing bolt.

In testimony whereof I hereunto affix my signature in presence of two witnesses.

THOMAS E. FALSEY.

Witnesses:
WM. L. LANO,
LOUIE C. JONES.

Copies of this patent may be obtained for five cents each, by addressing the "Commissioner of Patents. Washington, D. C."